UNITED STATES PATENT OFFICE.

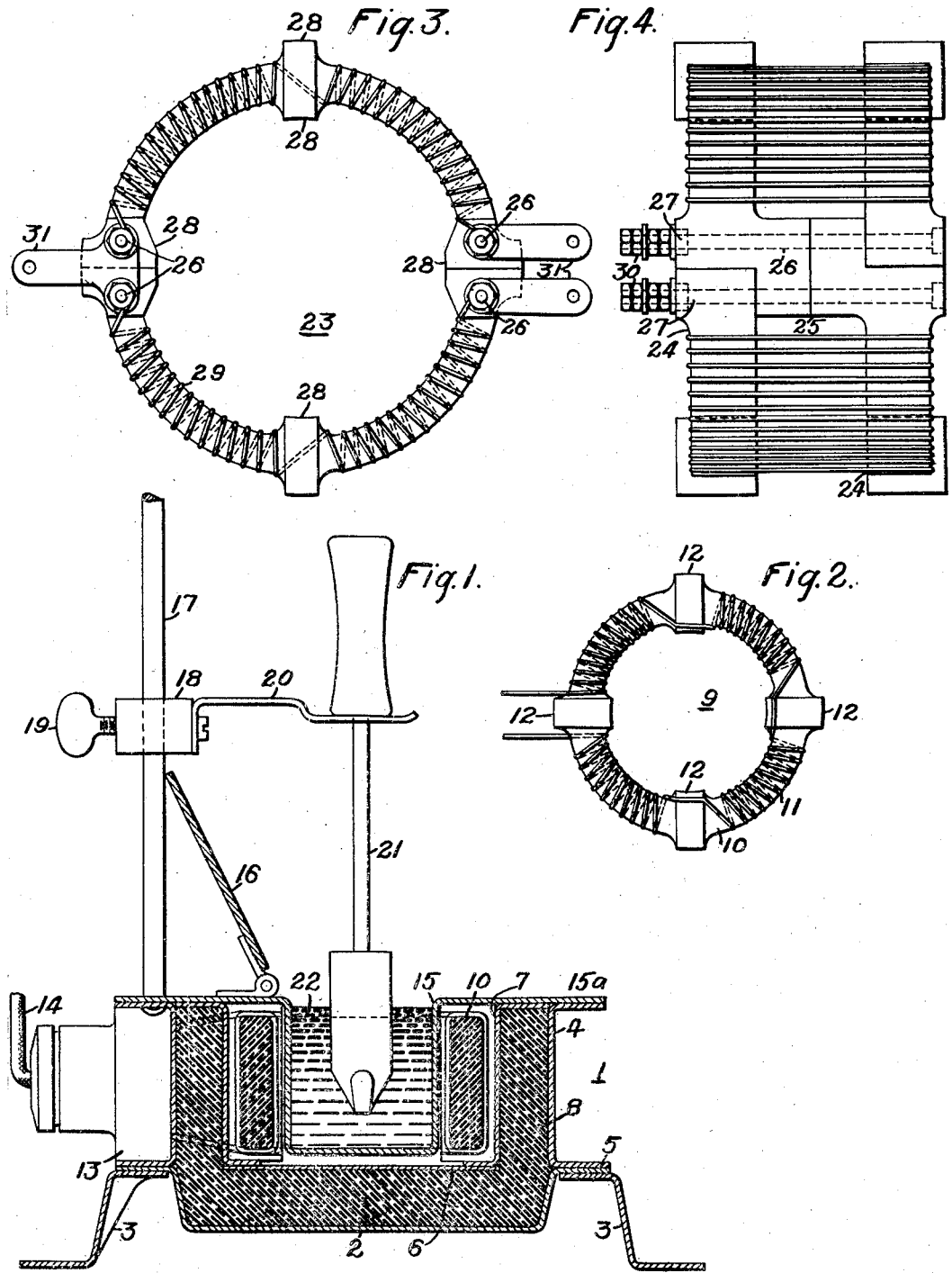

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

SOLDERING POT AND SOLDERING IRON.

1,425,633.   Specification of Letters Patent.   Patented Aug. 15, 1922.

Application filed December 10, 1919. Serial No. 343,877.

*To all whom it may concern:*

Be it known that I, ORA A. COLBY, a citizen of the United States, and a resident of Irwin, in the county of Westmoreland and State of Pennsylvania, have invented a new and useful Improvement in Soldering Pots and Soldering Irons, of which the following is a specification.

My invention relates to electrically heated apparatus and particularly to electrically heated solder pots, and it has for its objects to provide apparatus of the character designated of relatively high heat efficiency which shall comprise a heating element of simple and relatively inexpensive construction and an adjustable means for holding a soldering iron in heat-receiving relation in the solder pot.

In a preferred embodiment of my invention, I provide a substantially cup-shaped outer container and mount an inner member substantially concentric therewith to provide an annular space for heat-insulating material. A solder pot somewhat smaller than the inner member is mounted therein and a cylindrical heating element, provided with the usual attachment plug, is placed in the space surrounding the solder pot. Supporting means is provided for holding a soldering iron in heat-receiving relation to the solder pot.

In the single sheet of drawings, Figure 1 is a view, partly in vertical section and partly in side elevation, of a device embodying my invention; Fig. 2 is a top plan view of a heating element employed therein; Fig. 3 is a top plan view of a modified form of heating element, and Fig. 4 is a side elevation of the heating elements shown in Fig. 3.

A cylindrical container 1 comprises a relatively shallow metal base 2, a plurality of supports 3, and a cylindrical metal member 4, all of which may be spot-welded together, as at 5. A metal inner container comprises a bottom plate 6 and a cylindrical cup-shaped metal member 7, the outer diameter of the upper part of which is slightly less than the inner diameter of the member 4 so as to maintain the two members in concentric relation. A suitable heat-insulating material 8 is placed between the inner and outer containers to more effectively retain the heat in the inner container.

A heating element 9 comprises a substantially cylindrical refractory supporting member 10, upon which is wound a suitable resistor 11. The member 10 is provided with a plurality of radially-extending inner and outer projections 12 for a purpose to be hereinafter set forth. The heating element 9 is placed in the member 7 and suitable connection made to a contact terminal member 13, which co-operates with a cord 14 to energize the heating element when desired. A solder pot 15 is placed within the heating element, the projections 12 on the member 10 serving to maintain the pot 15 in spaced relation within the element 9, to maintain the element 9 in spaced relation in the container 7 and also to prevent contact between the resistor 11 and the metal members 7 and 15. The pot 15, as here shown, is provided with a relatively wide flat horizontal rim 15ª which serves as a cover for the inner container 7 and is provided with a hinged cover member 16.

A vertically extending rod 17 is suitably secured to the rim 15ª and has mounted thereon an adjustable clamping block 18 which is provided with a clamping screw 19 and a fork 20 suitably secured thereto. A soldering iron 21 may be so suspended from the fork 20 as to have the tip thereof dip into the solder 22 which may be contained in the solder pot 15 and be heated thereby.

Figs. 3 and 4 show a modification of the heating element shown in Fig. 2 which is particularly applicable to solder pots of larger size. A heating element 23 comprises a plurality of arcuate refractory members 24 of substantially rectangular cross-section and extending over approximately 180° of arc. The main body of the member 24 is provided, at one end, with an integral extension 25 of substantially L-shape. Two of the members 24 may be placed in proper co-operative position to form an annular ring, and two such rings may be placed back-to-back to form a complete refractory support. These may be bolted together by means of bolts 26 which are placed in openings 27 provided, for that purpose, near the ends of the individual members 24. Spacing lugs or projections 28, similar to the projections 12 on the member 10, are provided on the members 24. A resistor 29 is wound around the supporting members 24 and connected to the bolts 26 which are provided with extra nuts 30 to hold terminal plates 31. This construction provides a heating element having a support comprising a number of similar and relatively simple pieces of molded refractory material which may be placed in co-operative relation to form a complete supporting member and held therein by a relatively small number of bolts.

The device embodying my invention thus provides a simple and compact electrically-heated solder pot comprising relatively few parts and heat-insulated to a high degree, and also provides means for heating a soldering iron.

While I have shown a specific application of the device embodying my invention, changes may be made therein without departing from the spirit and the scope of my invention, and I desire, therefore, that only such limitations shall be placed thereon as are imposed by the prior art or are specifically set forth in the appended claims.

I claim as my invention:

1. In an electrically-heated apparatus, the combination with material to be heated and a heat-insulating supporting means therefor, of an annular resistor-supporting means, and a resistor wound thereon, said resistor-supporting means being located in spaced relation intermediate the material to be heated and said heat-insulating supporting means.

2. In an electrically-heated apparatus, the combination with a supporting member, heat-insulating means and a container in said supporting member, of a heating element surrounding said container, said heating element comprising a tubular refractory support, a resistor wound on said refractory support and embodying means on said resistor support for holding said container in spaced relation in said heat-insulating means.

3. In an electrically-heated solder pot, the combination with a supporting member, heat-insulating means in said member and a solder pot mounted in said supporting member, of a heating element of substantially ring shape surrounding said solder pot, and means mounted on said supporting member for holding a soldering iron in heat-receiving relation to said solder pot.

4. In an electrically-heated solder pot, the combination with a supporting member, heat-insulating means in said member, and a solder pot mounted in said supporting member, of a heating element of substantially ring shape surrounding said solder pot, and adjustable means mounted on said supporting member for holding a soldering iron in heat-receiving relation to said solder pot.

5. In an electrically-heated apparatus, the combination with a heat-insulating supporting member and a container mounted therein, of an electrical heating element in said supporting member, embodying means on said element for holding said container in spaced relation in said heating element, and adjustable means for holding a soldering iron in heat-receiving relation to said container.

6. An electrical heating element comprising a substantially annular refractory member, integral spacing means on said member and a resistor wound on said annular member between said spacing means.

7. In an electrically-heated solder pot, the combination with a plurality of nested receptacles of substantially cup-shaped, heat-insulating means located between said receptacles, and a container supported by said receptacles, of a heating element located between said container and said receptacles, said heating element comprising a tubular refractory member, a resistor wound thereon, and means on said refractory member for holding said heating element in spaced relation between said receptacles and said container.

In testimony whereof, I have hereunto subscribed my name this 29th day of November, 1919.

ORA A. COLBY.